United States Patent
Hayden et al.

(10) Patent No.: US 11,994,112 B2
(45) Date of Patent: May 28, 2024

(54) SPAR STRUCTURE WITH INTEGRATED DOWN CONDUCTOR ELEMENT FOR LIGHTNING PROTECTION SYSTEM

(71) Applicant: BLADE DYNAMICS LIMITED, Eastleigh (GB)

(72) Inventors: Paul Trevor Hayden, Eastleigh (GB); Harald Behmer, Eastleigh (GB); Mark Thomas Noonan, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/290,947

(22) PCT Filed: Nov. 5, 2019

(86) PCT No.: PCT/EP2019/080222
§ 371 (c)(1),
(2) Date: May 3, 2021

(87) PCT Pub. No.: WO2020/094633
PCT Pub. Date: May 14, 2020

(65) Prior Publication Data
US 2021/0372373 A1    Dec. 2, 2021

(30) Foreign Application Priority Data
Nov. 6, 2018    (GB) ..................... 1818073

(51) Int. Cl.
F03D 80/30    (2016.01)
F03D 1/06    (2006.01)
H02G 13/00    (2006.01)

(52) U.S. Cl.
CPC ........... *F03D 80/30* (2016.05); *F03D 1/0675* (2013.01); *H02G 13/40* (2013.01); *F05B 2280/2001* (2013.01); *F05B 2280/2006* (2013.01)

(58) Field of Classification Search
CPC .............................. F03D 80/30; F03D 1/0675
See application file for complete search history.

(56) References Cited

U.S. PATENT DOCUMENTS 7,494,324 B2 *    2/2009    Hibbard ................. H02G 13/80
                                                            416/241 A
8,118,559 B2 *    2/2012    Llorente Gonzalez .....................
                                                            F03D 1/065
                                                            416/226

(Continued)

FOREIGN PATENT DOCUMENTS

EP    1830063 A1    9/2007
EP    3483424 A1    5/2019

(Continued)

OTHER PUBLICATIONS

English translation of FR3044349A1 (Year: 2017).*

(Continued)

*Primary Examiner* — J. Todd Newton
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

A sparcap for a spar structure inside a wind turbine blade is provided. A down conductor element is integrated on a side of the sparcap such that after assembly of the sparcap into the spar structure, the down conductor element extends along an outer corner of the spar structure.

14 Claims, 4 Drawing Sheets

(56) References Cited

U.S. PATENT DOCUMENTS

| | | | |
|---|---|---|---|
| 8,899,936 B2 * | 12/2014 | Hancock | B29C 66/112 |
| | | | 29/889.72 |
| 9,051,921 B2 * | 6/2015 | Arocena De La Rua | |
| | | | F03D 1/0675 |
| 9,816,482 B2 * | 11/2017 | Caruso | F03D 1/0633 |
| 10,294,925 B2 * | 5/2019 | Klein | F03D 1/0675 |
| 10,584,684 B2 * | 3/2020 | Nielsen | F03D 1/0675 |
| 10,648,456 B2 * | 5/2020 | Shain | F03D 80/30 |
| 10,844,843 B2 * | 11/2020 | Fujioka | F03D 9/25 |
| 10,968,896 B2 * | 4/2021 | Klein | H02G 13/40 |
| 11,248,587 B2 * | 2/2022 | Christiansen | F03D 80/30 |
| 11,619,205 B2 * | 4/2023 | Sato | F03D 80/30 |
| | | | 416/223 R |
| 2007/0074892 A1 | 4/2007 | Hibbard | |
| 2011/0171032 A1 | 7/2011 | Hancock et al. | |
| 2017/0058866 A1 * | 3/2017 | Caruso | F03D 1/0675 |
| 2017/0122295 A1 * | 5/2017 | Klein | F03D 80/30 |
| 2018/0180031 A1 | 6/2018 | Klein et al. | |
| 2019/0145383 A1 * | 5/2019 | Christiansen | F03D 1/0675 |
| | | | 416/146 R |
| 2019/0195203 A1 * | 6/2019 | Fujioka | H02G 13/00 |

FOREIGN PATENT DOCUMENTS

| | | | | |
|---|---|---|---|---|
| FR | 3044349 A1 * | 6/2017 | | F03D 1/06 |
| WO | 2009153341 A2 | 12/2009 | | |
| WO | 2009153344 A1 | 12/2009 | | |
| WO | 2015055215 A1 | 4/2015 | | |
| WO | WO-2017089591 A1 * | 6/2017 | | F03D 1/0675 |

OTHER PUBLICATIONS

English translation of WO2017089591A1 (Year: 2017).*
International Search Report dated Jan. 17, 2020 for application No. PCT/EP2019/080222.
Priority Search Report dated Apr. 26, 2019 for application No. GB1818073.7.
Communication pursuant to Article 94(3) EPC dated Nov. 21, 2022 for Application No. 19 798 294.5.

* cited by examiner

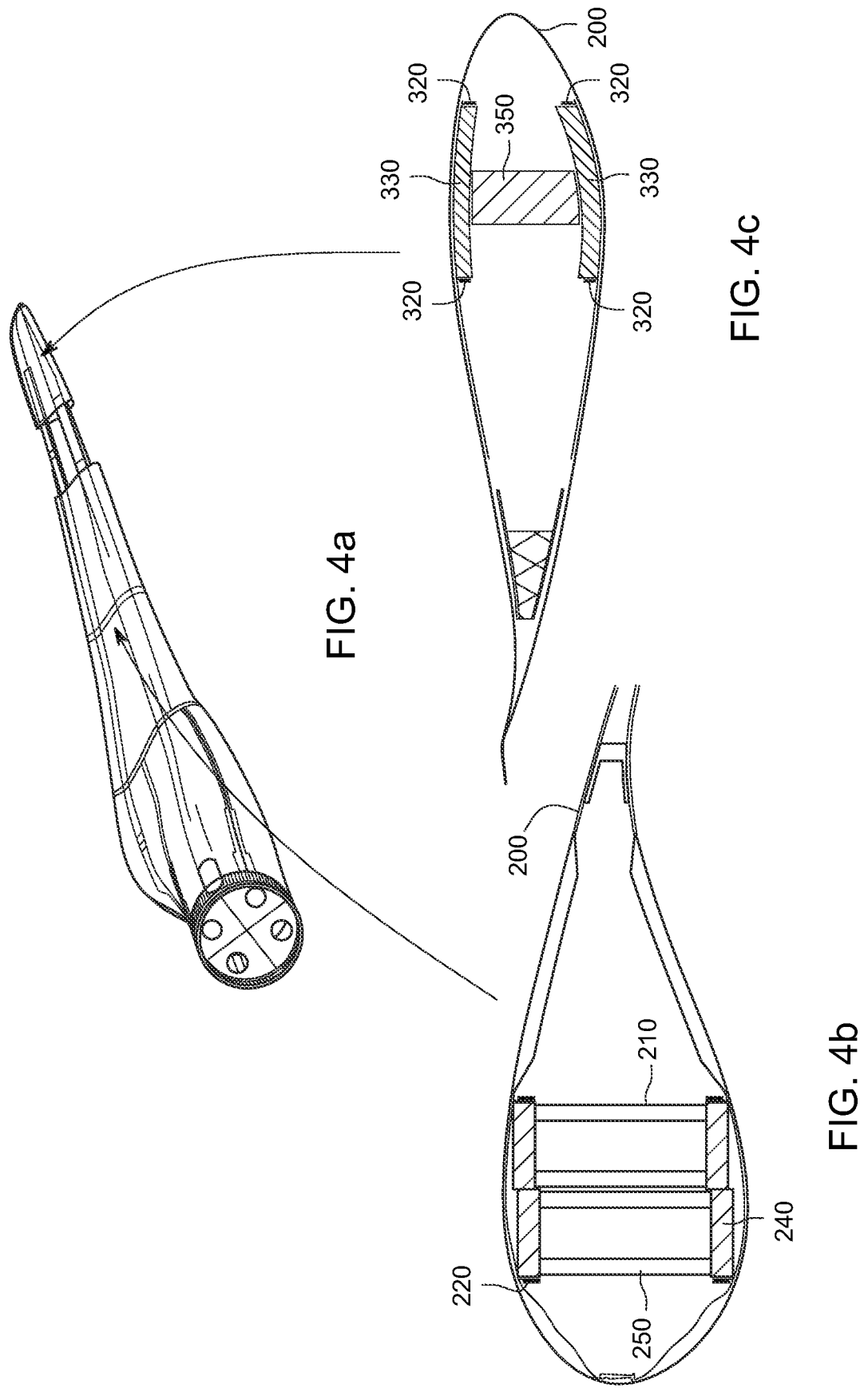

SPAR STRUCTURE WITH INTEGRATED DOWN CONDUCTOR ELEMENT FOR LIGHTNING PROTECTION SYSTEM

This is a National Phase Application filed under 35 U.S.C. 371 as a national stage of PCT/EP2019/080222, filed Nov. 5, 2019, an application claiming the benefit of European Application No. 1818073.7, filed Nov. 6, 2018, the content of each of which is hereby incorporated by reference in its entirety.

FIELD OF THE INVENTION

This invention provides a sparcap and a spar structure with an integrated down conductor element that is used in a lightning protection system of a wind turbine blade. The invention also provides a wind turbine blade with a corresponding sparcap and spar structure and a method of manufacturing these elements.

BACKGROUND OF THE INVENTION

Lightning strikes are an increased operational risk for wind turbines as turbines get larger and their structural elements become higher (e.g. longer blades). Longer blade designs drive the selection of carbon as a raw material which increases the complexity of lightning protection system (LPS) since lightning protection systems for carbon fibre reinforced wind turbine blades are more complicated than for glass fibre wind turbine blade. Carbon fibre as a structural material has excellent specific strength and youngs modulus, but is also electrically conductive. Therefore, the lightning protection system for a blade designed with such materials needs to ensure (1) that lightning strikes do not directly attach to the carbon sparcaps (e.g. puncturing through blade shells) causing extensive damage and (2) that the current safely flows down the conductor to earth in a controlled manner, without causing internal flashovers and further damage to the carbon sparcaps within the structure (which is a known problem). This is achieved by ensuring that the lightning conductor is equipotentially bonded to the carbon sparcaps at defined positions which ensures that large voltage differences are not generated between materials (blade structure)/conductors causing flashovers.

EP 1 830 063 A1 focuses on two down conductors embedded within a sparbox along the aero surface (i.e. the sides of the sparcaps facing the blade shells) with subsequent connection to side receptors. WO2013/007267 A1 describes a mesh being placed over the aerodynamic sides of the sparbox and connected to a down conductor cable. It includes features to promote strikes at the tip in line with a zoning concept.

The problem arises to provide a lightning protection system which is particularly useful for carbon fibre reinforced wind turbine blades and reduces the amount of current to pass through the carbon fibre. Moreover, it is desirable to have a lightning protection system which can be used for example with modular wind turbine blades where blade parts (e.g. spar sections) can be manufactured with integrated down conductor elements and shipped to a second location for assembly.

SUMMARY OF THE INVENTION

The invention is defined by the independent claims. Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar or different from the embodiments set forth below.

According to a first aspect, a sparcap is provided for a spar structure inside a wind turbine blade. A down conductor element is integrated on a side of the sparcap such that after assembly of the sparcap into the spar structure, the down conductor element extends along an outer corner of the spar structure.

According to a second aspect, a spar structure to be arranged inside a wind turbine blade is provided. An integrated down conductor element extends along an outer corner of the spar structure.

According to a third aspect, a method is provided of manufacturing a sparcap for a spar structure inside a wind turbine blade. The method includes bonding a down conductor element to a side of the sparcap such that after assembly of the sparcap into the spar structure, the down conductor element extends along an outer corner of the spar structure.

BRIEF DESCRIPTION OF THE DRAWINGS

FIG. 4a shows a wind turbine blade which has two different spar structures inside its shell;

FIG. 4b shows a double box spar structure used in the inboard section of a wind turbine blade;

FIG. 4c shows a spar that is used in the tip end section of a wind turbine blade;

DESCRIPTION OF THE EMBODIMENTS

Figure 1:
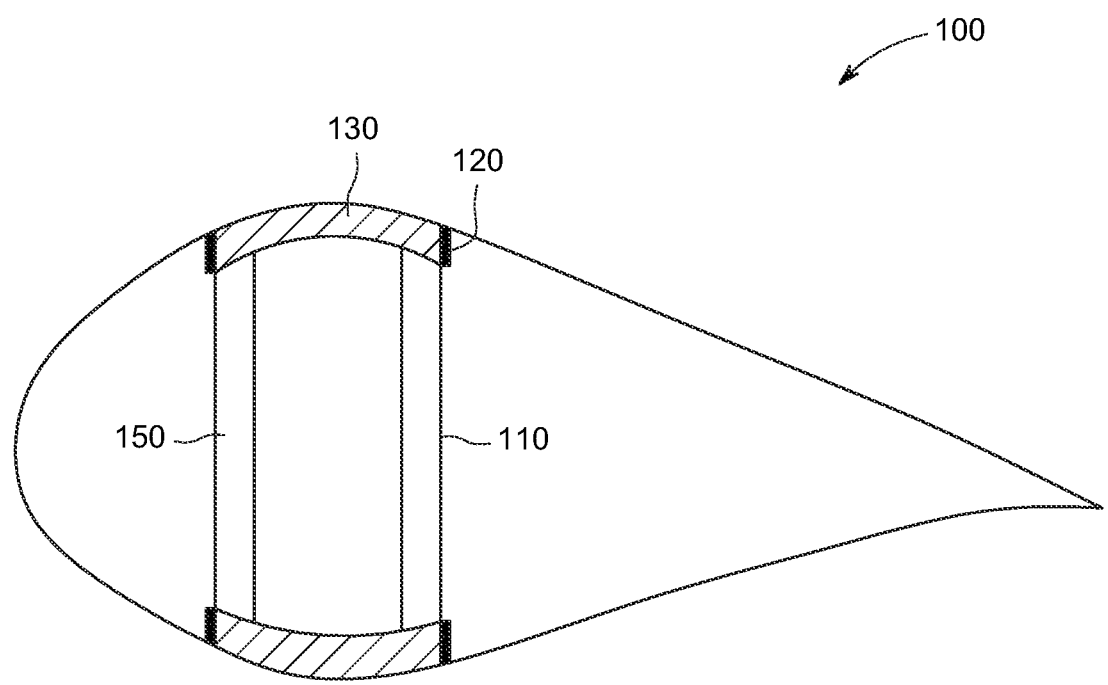
FIG. 1 shows a cross section of a wind turbine blade which has a spar structure inside which includes down conductor elements in its outer corners.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Reference will now be made in detail to the various embodiments, one or more example of which are illustrated in the figures. Each example is provided by way of explanation and is not meant as a limitation. For example, features illustrated or described as part of one embodiment FIG. 1 shows a cross section of a wind turbine blade 100 which has a spar structure 110 inside the shell of the wind turbine blade 100. However, before continuing with the description of FIG. 1, a few items of the invention will be discussed.

In some of the embodiments, a sparcap for a spar structure inside a wind turbine blade is provided. A down conductor element is integrated on a side of the sparcap such that after assembly of the sparcap into the spar structure, the down conductor element extends, optionally longitudinally, along an outer corner of the spar structure. The inventors have found out through simulation and testing that the outer corners of a spar structure are the most efficient positions for conduction of current. Down conductor elements which are positioned in these corners conduct the major proportion of current (between down conductor and carbon). This arrangement of down conductor elements forms a Faraday cage and forces most of the current into the down conductor elements leaving a smaller amount of current to pass through the carbon fibre. The down conductor elements which carry the majority of the electrical energy are integrated with the sparcaps. This integration ensures that there is good electrical bonding reducing the risks of uncontrolled flashovers, but is also geometrically positioned to account for the effect of the electric/magnetic fields which "push" the current to flow in the corners of the sparcaps. A positioning of down conductor elements in the outer corners of the spars leads to an improved conduction of the currents. It should be mentioned that the positioning of down conductor elements in the corners of the spar structure does not affect the quality of the bond to the upper (shell) surfaces of the wind turbine blades. In some embodiments, the down conductor element forms part of the sparcap. In some embodiments, the down conductor element is positioned on an outer corner and/or outer side and/or outer surface of the sparcap, preferably so that the down conductor element is arranged outside the sparcap, and preferably so that the down conductor element extends along the outer corner and/or outer side and/or outer surface of the sparcap. In some of the embodiments, the down conductor element is bonded and integrated within a (modular) sparcap which can then be shipped to a further manufacturing location for assembly of the spar. A (modular) sparcap typically has a length between 12 to 30 m, depending upon the overall wind turbine blade length.

Figure 2:
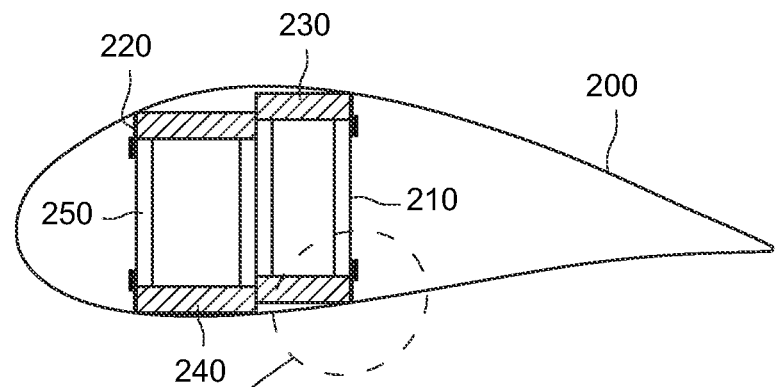
FIG. 2 shows a cross section of a wind turbine blade which has a double box spar structure inside which includes down conductor elements in its outer corners.

The term "spar structure" as used herein denotes a structure inside a wind turbine blade that provides the structural stiffness to transfer aerodynamic loads to the hub. In some of the embodiments, a spar structure may be an individual spar (FIG. 1, 4c), while in other embodiments the spar structure has two or more spars adjacent each other (FIG. 2, 4b). In some of the embodiments, a spar structure comprises one or more sparboxes (FIG. 1, 2, 4b) which comprises two horizontal sparcaps and two vertical shearwebs.

The invention is illustrated by means of drawings showing a 2D cross section of a wind turbine blade. However, the term "corner" as used herein refers to a line where two surfaces of a spar structure meet. That means that the down conductor elements extend along a (part of a) line from the inboard section of the blade to the tip section of the blade or a part therefrom.

In some of the embodiments, the sparcap is reinforced with or made of carbon fibre or glass fibre. It has been recognized that the present invention is particularly useful with carbon fibre sparcaps but the concept could be utilized with glass fibre blades, too. Carbon fibre requires more attention in terms of lightning protection due to the carbon fibre's conductivity (low electrical resistance).

In some of the embodiments, the down conductor element comprises a foil, a mesh, a line, a braid or a cable or a combination thereof. In some of the embodiments, the down conductor element comprises a braid combined with an expanded foil. This allows an overtapping of the spar to the shell of the wind turbine blade, with the foil providing an electrical bonding between the braid and the bulk of the carbon sparcap. The form of the integrated down conductor can be changed in different parts of the wind turbine blade to suit the location and manufacturing method. Multiple forms of the down conductor element can be used to optimize the performance of the integrated down conductor depending on its location inside the wind turbine blade. In some embodiments, the down conductor element comprises a down conductor line, such as a braid or a cable. The down conductor line may be integrated on a side of the sparcap and may be positioned at an outer corner of the spar structure.

In some of the embodiments, the down conductor element is not only on one side of the sparcap but is wrapped around a corner of the sparcap.

In some of the embodiments, the down conductor element comprises and/or is made of metal. In some of these embodiments, the down conductor element comprises and/or is made of copper, a copper alloy or aluminium. The choice of the material of the down conductor element can be made in consideration of other requirements such as galvanic corrosion, which is particularly important when considering blades with carbon fibre sparcaps.

In some of the embodiments, the down conductor element may extend along at least a majority of the longitudinal length, preferably the entire length, of the sparcap and/or spar structure.

Some of the embodiments relate to a spar structure to be arranged inside a wind turbine blade. An integrated down conductor element extends along an outer corner of the spar structure. In some of the embodiments, the integrated down conductor element does not extend across an entire surface/area of the spar but only extends along one or more outer corners of the spar.

Additionally or alternatively, the spar structure may comprise a sparcap as previous disclosed and an integrated down conductor element extending, preferably longitudinally, along an outer corner of the spar cap. The down conductor element may be integrated on an outer corner and/or outer side and/or outer surface of the sparcap.

In some of the embodiments, an integrated conductor element extends along each outer corner of the spar structure. Multiple conductor elements lead to a redundancy in the lightning protection system.

In some of the embodiments, the spar structure may comprise a plurality of down conductor elements, such as a plurality of down conductor cables, and wherein cross-sections of the plurality of down conductor elements, preferably transverse to the extent of the down conductor elements, may not be electrically connected to each other, optionally at some positions along the longitudinal extent of the plurality of down conductor elements.

In some of the embodiments, the spar structure is a sparbox which includes two horizontal sparcaps and two vertical shearwebs that are bonded to the horizontal sparcaps. In some of the embodiments, the sparcaps include integral channels into which the shearwebs are bonded during assembly.

In other embodiments, the spar has two horizontal sparcaps and one vertical shearweb that is bonded to the horizontal sparcaps. Such a spar structure is typically used in the tip section of a wind turbine blade.

In some of the embodiments, the spar structure has four outer corners and a down conductor element extends along each of the four outer corners of the spar structure.

In some of the embodiments, the down conductor element extends across a bonding seam between a horizontal sparcap and an adjacent shearweb.

Some of the embodiments relate to a wind turbine blade which includes a spar structure inside according to any one of the spar structures described above.

In some of the embodiments, the spar structure inside the wind turbine blade can change when going from the inboard section of the wind turbine blade to the tip section of the wind turbine blade. In some of the embodiments, the wind turbine includes in an inboard section of the wind turbine blade, a sparbox comprising two horizontal sparcaps and two vertical shearwebs that are bonded to the horizontal sparcaps. In a tip section of the wind turbine blade, a spar structure includes two horizontal sparcaps and one shearweb that is bonded to the horizontal sparcaps. In both sections, the down conductor elements extend along the outer corners of the corresponding spar structures. During assembly these sections and down conductor elements are then connected together such that they are continuous.

In some of the embodiments, the wind turbine blade includes two adjacent sparboxes in the inboard section of the wind turbine blade and a down conductor element extends along each of the four outer corners of the two adjacent sparboxes.

In some of the embodiments, the two adjacent sparboxes are offset to each other.

Some of the embodiments relate to a method of manufacturing a sparcap for a spar inside a wind turbine blade. The method includes integrating and/or integrating by bonding and/or bonding a down conductor element to or on a side of the sparcap such that after assembly of the sparcap into the spar structure the down conductor element extends along an outer corner of the spar structure.

In some of the embodiments, the down conductor element is bonded to the sparcap during manufacture of the sparcap. Integration at this stage ensures there is good electrical connection between the sparcap (carbon fibre) and the down conductor element, which could not be achieved if it was completed as a second step. This integration ensures that the down conductor element is always at the same electrical potential as the sparcap. This solution of equipotential bonding is achieved without the use of mechanical fastening.

In some of the embodiments, the down conductor element and the sparcap are cured simultaneously. For example, a copper braid (down conductor element) is embedded within a carbon fibre spar which ensures there is a good connection of the two materials (good conductivity/low electrical resistance). Since this is a composite structure, when the polymer matrix system cures (a prepreg or liquid resin system) the down conductor element becomes integrated. Examples of polymer are epoxy, polyester, vinyester etc. Thereby, excellent electrical connection is achieved between the down conductor element and the carbon fibre of the sparcap.

Some of the embodiments relate to a method of assembling a spar structure to be arranged inside a wind turbine blade. The method includes manufacturing two sparcaps according to the method as described above and assembling the sparcaps with at least one shearweb into a spar structure such that down conductor elements of the sparcaps extend along outer corners of the spar structure.

Returning now to FIG. 1 which shows a cross section of a wind turbine blade 100 which has as spar structure an individual spar 110 inside the shell of the wind turbine blade. The spar 110 is made of carbon fibre and has two horizontal sparcaps 130 and two vertical shearwebs 150 which are bonded to the two sparcaps 130. An integrated down conductor element 120 of a lightning protection system extends along each of the four corners of the spar 110. The integration of the down conductor elements 120 into the spar 110 is performed by curing the down conductor elements 120 simultaneously with the carbon fibre. The down conductor elements 120 are bonded to the vertical sides of the sparcaps 130 such that the down conductor elements 120 are positioned in each of the four outer corners of the spar 110. The outer corners of the spar 110 have been determined to be an efficient position for conduction of current. In the embodiment shown in FIG. 1 the down conductor elements 120 are copper braids.

FIG. 2 shows a cross section of a wind turbine blade 200 with a double box spar structure 210 which has two spar boxes each of which has two horizontal sparcaps 230 and two vertical shearwebs 250. The two spar boxes are offset to each other so that the two rectangular spar boxes fit in with the cross section of the wind turbine blade 200. A down conductor element 220 is positioned at each outer corner of the double box spar structure 210. The down conductor element 220 is a combination of a copper braid 260 and an expanded foil 270.

Figure 3A:
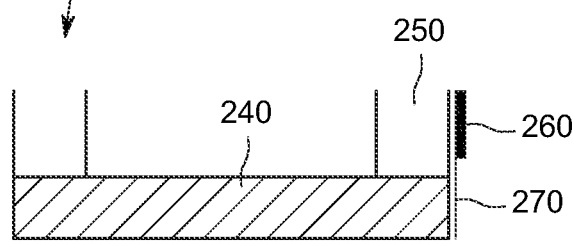
FIG. 3a shows the arrangement of a down conductor element which has a copper braid in combination with an expanded foil.

FIG. 3a shows in greater detail structure of the down conductor element 220 which is a combination of a copper braid 260 and an expanded foil 270. The down conductor elements 220 do not only extend on the vertical sides of the sparcap 240 but extend across a bonding seam between the sparcap 240 and a shearweb 250.

Figure 3B:
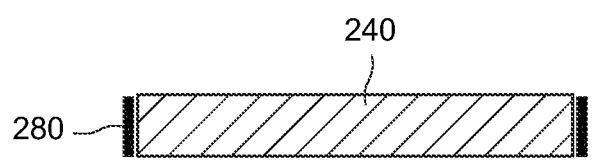
FIG. 3b shows a sparcap with integrated down conductor elements on its vertical sides.

FIG. 3b shows an alternative arrangement to the embodiment of FIG. 3a in which the sparcap 240 which has an integrated down conductor element 280 on each vertical side such that when the sparcap 240 is assembled into the spar structure the integrated down conductor elements extend along each outer corner of the spar structure. (When the embodiment of FIG. 3b is used in the embodiment of FIG. 2, then the left down conductor element 280 is omitted and is put on the left side of the sparcap 240 of the left spar.)

Figure 3C:
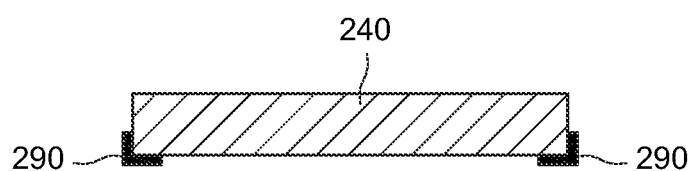
FIG. 3c shows a sparcap in which down conductor elements are wrapped around the corners of the sparcap.

FIG. 3c shows another alternative embodiment in which down conductor elements 290 are wrapped around two outer corners of the sparcap 240. Of course, this embodiment can be used in the embodiment of FIG. 1

FIG. 4a shows a wind turbine blade in which the spar structure changes such that the lightning protection system needs to be flexible and adaptive to a modular design. In the embodiment shown, the spar structure in the inboard section of the wind turbine blade is a double box spar structure, while the spar structure in the tip section of the wind turbine blade includes a shearweb that is bonded to two sparcaps.

FIG. 4b shows a spar structure which is used in the in inboard section of the wind turbine blade shown in FIG. 4a. The spar structure corresponds basically to the spar structure shown in FIG. 2 which has two sparboxes with an offset to better fit in with the shell of the wind turbine blade 200. Down conductor elements 220 extend along the four outer corners of the double box spar structure. It should be noted that the spar structure shown in FIG. 4b can be used not only in the inboard section of the wind turbine blade but throughout the entire wind turbine blade.

FIG. 4c shows a spar which is used in the tip section of the wind turbine blade 200. The spar has two horizontal sparcaps 330 which are bent to fit with the shell of the wind turbine blade. The spar further has one vertical shearweb 350 which is bonded to the two sparcaps 330. Down conductor elements 320 as part of the lightning protection system are arranged in the four outer corners of the spar. It should be noted that the spar in FIG. 4c can be used not only in the tip section of the wind turbine blade but throughout the entire wind turbine blade.

Figure 5:
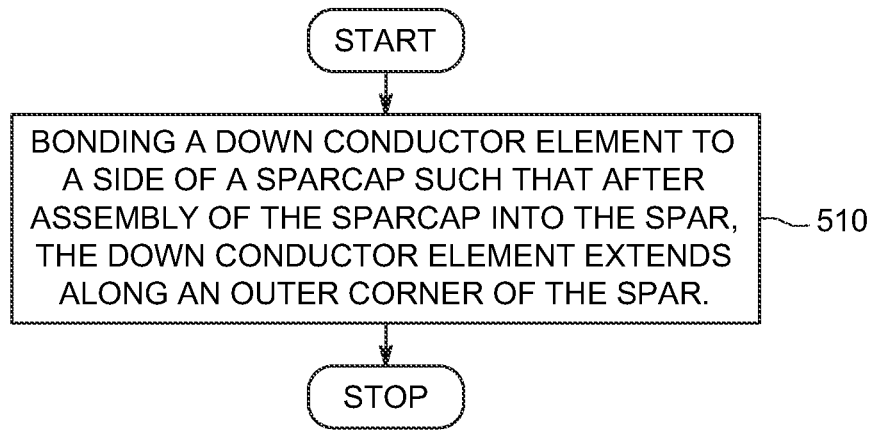
FIG. 5 shows a method of manufacturing a sparcap for a spar structure inside a wind turbine blade.

FIG. 5 shows a method of manufacturing a sparcap for a spar structure inside a wind turbine blade. At 510, a down conductor element is bonded to a side of the sparcap such that after assembly of the sparcap into the spar structure the down conductor element extends along an outer corner of the spar structure. The down conductor element is bonded to a side of the sparcap during manufacture of the sparcap. For example, the down conductor element is cured simultaneously with the curing of the carbon fibre.

Figure 6:
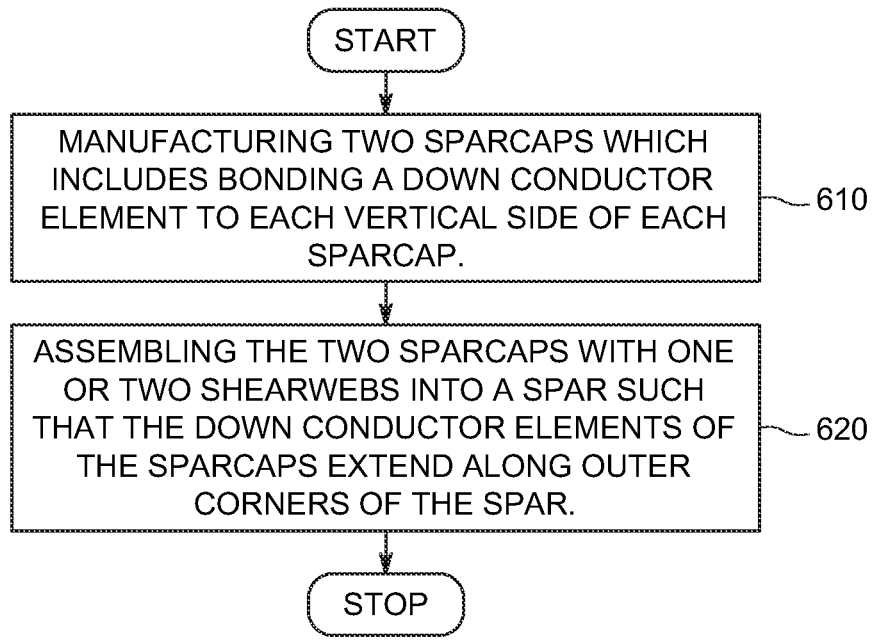
FIG. 6 shows a method of assembling a spar structure to be arranged inside a wind turbine blade.

FIG. 6 shows a method of assembling a spar structure to be arranged inside a wind turbine blade. At 610, two sparcaps are manufactured which includes bonding a down conductor element to each vertical side of each sparcap. At 620, the two sparcaps are assembled with one or two shearwebs into a spar structure such that the down conductor elements of the sparcaps extend along outer corners of the spar structure.

The invention claimed is:

1. A spar cap for a spar structure inside a wind turbine blade, wherein first and second down conductor elements are integrated on respective sides of the spar cap such that after assembly of the spar cap into the spar structure, the first and second down conductor elements extend along respective first and second outer corners of the spar structure, wherein the first and second down conductor elements are respectively wrapped around first and second outer corners of the spar cap.

2. The spar cap of claim 1, wherein the spar cap is reinforced with or made of carbon fibre or glass fibre.

3. The spar cap of claim 1, wherein the first and second down conductor elements each comprise a foil, a mesh, a braid or a cable or a combination thereof.

4. The spar cap of claim 1, wherein the first and second down conductor elements are each made of metal.

5. The spar cap of claim 4, wherein the first and second down conductor elements are each made of copper, a copper alloy or aluminum.

6. The spar cap of claim 1, wherein the first and second down conductor elements are each part of a lightning protection system for the wind turbine blade.

7. A spar structure to be arranged inside a wind turbine blade, wherein an integrated down conductor element of a plurality of integrated down conductor elements extends along each respective outer corner of the spar structure, wherein the spar structure comprises at least one spar cap according to claim 1, and wherein the plurality of integrated down conductor elements comprise the first and second down conductor elements.

8. The spar structure of claim 7, wherein the at least one spar cap comprises first and second spar caps, wherein the spar structure comprises a spar box, and wherein the spar box comprises the first spar cap and the second spar cap, wherein the first and second spar caps are horizontal, the spar box further comprising two vertical shear webs that are bonded to the spar caps.

9. The spar structure of claim 8, wherein each of the down conductor elements extends across a bonding seam between one of the spar caps and an adjacent one of the shear webs.

10. The spar structure of claim 7, wherein the at least one spar cap comprises first and second spar caps, wherein the first and second spar caps are horizontal, the spar structure further comprising one shear web that is bonded to the first and second spar caps.

11. The spar structure of claim 7, wherein the spar structure has four outer corners.

12. A wind turbine blade comprising a spar structure inside according to claim 7.

13. A method of manufacturing a spar cap for a spar structure inside a wind turbine blade, the method comprising:
    bonding first and second down conductor elements to respective sides of the spar cap such that after assembly of the spar cap into the spar structure, the first and second down conductor elements extend along respective first and second outer corners of the spar structure; and
    respectively wrapping the first and second down conductor elements around the first and second outer corners of the spar cap.

14. A method of assembling a spar structure to be arranged inside a wind turbine blade, the method comprising:
    manufacturing two spar caps according to the method of claim 13; and
    assembling the spar caps with at least one shear web into the spar structure.

* * * * *